US011238389B2

(12) United States Patent
Srinivasan

(10) Patent No.: US 11,238,389 B2
(45) Date of Patent: Feb. 1, 2022

(54) SYSTEM AND METHOD FOR RISK MANAGEMENT IN A SUPPLY CHAIN

(71) Applicant: Tata Consultancy Services Limited, Mumbai (IN)

(72) Inventor: Ramakrishnan Sundaram Srinivasan, Mason, OH (US)

(73) Assignee: Tata Consultancy Limited Services, Mumbai (IN)

( * ) Notice: Subject to any disclaimer, the term of this patent is extended or adjusted under 35 U.S.C. 154(b) by 1048 days.

(21) Appl. No.: 14/977,883

(22) Filed: Dec. 22, 2015

(65) Prior Publication Data
US 2017/0017909 A1     Jan. 19, 2017

(30) Foreign Application Priority Data
Jul. 14, 2015   (IN) .......................... 2659/MUM/2015

(51) Int. Cl.
*G06Q 10/06* (2012.01)
*G06Q 10/08* (2012.01)

(52) U.S. Cl.
CPC ... *G06Q 10/0635* (2013.01); *G06Q 10/06315* (2013.01); *G06Q 10/06375* (2013.01);
(Continued)

(58) Field of Classification Search
CPC ......... G06Q 10/0631; G06Q 10/06312; G06Q 10/06313; G06Q 10/0635;
(Continued)

(56) References Cited

U.S. PATENT DOCUMENTS

| 5,953,707 A  * | 9/1999 | Huang .................. G06Q 10/06 705/7.25 |
| 8,626,558 B2 | 1/2014 | Dudley et al. |

(Continued)

FOREIGN PATENT DOCUMENTS

WO   WO-2001/082135   11/2001

OTHER PUBLICATIONS

S. Darmoul, H. Pierreval and S. Hajri-Gabouj, "Using ontologies to capture and structure knowledge about disruptions in manufacturing systems: An immune driven approach," ETFA2011, 2011, pp. 1-7. (Year: 2011).*

(Continued)

*Primary Examiner* — Rutao Wu
*Assistant Examiner* — Sarjit S Bains
(74) *Attorney, Agent, or Firm* — Finnegan, Henderson, Farabow, Garrett & Dunner, L.L.P.

(57) ABSTRACT

The present disclosure relates to systems and methods for risk management in a supply chain. The system is configured to maintain a supply chain repository storing an original buffer level, and a master plan. Further, the system is configured to monitor each stage associated with the supply chain to identify at least one of a short term disruption or a long term disruption associated with a stage of the supply chain. Further, the system is configured to resolve the short term disruption by updating the original buffer level of an inventory or by revising the current plan and at least one of the set of future plans associated with the supply chain. Further, the system is configured to resolve the long term disruption in the supply chain using a set of problems and a set of solutions stored in a historical database.

13 Claims, 10 Drawing Sheets

(52) U.S. Cl.
CPC ....... *G06Q 10/087* (2013.01); *G06Q 10/0631* (2013.01); *G06Q 10/06312* (2013.01); *G06Q 10/06313* (2013.01); *G06Q 10/08* (2013.01); *G06Q 10/0838* (2013.01); *G06Q 10/0875* (2013.01)

(58) Field of Classification Search
CPC ............. G06Q 10/06375; G06Q 10/08; G06Q 10/0838; G06Q 10/087; G06Q 10/0875
See application file for complete search history.

(56) References Cited

U.S. PATENT DOCUMENTS

| | | | | |
|---|---|---|---|---|
| 9,721,294 | B1* | 8/2017 | Vakil | G06Q 40/00 |
| 2003/0033179 | A1 | 2/2003 | Katz et al. | |
| 2006/0155595 | A1* | 7/2006 | Johannsen | G06Q 10/06 705/7.41 |
| 2007/0124009 | A1* | 5/2007 | Bradley | G06G 1/14 700/99 |
| 2008/0015721 | A1* | 1/2008 | Spearman | G06Q 10/087 700/99 |
| 2009/0248488 | A1* | 10/2009 | Shah | G06Q 10/06375 705/7.28 |
| 2009/0307040 | A1 | 12/2009 | Ayala et al. | |
| 2010/0088138 | A1* | 4/2010 | An | G06Q 10/06 705/7.17 |
| 2013/0018696 | A1* | 1/2013 | Meldrum | G06Q 10/06 705/7.27 |
| 2013/0190913 | A1* | 7/2013 | Lamparter | G06Q 10/08 700/99 |
| 2014/0018951 | A1 | 1/2014 | Linton et al. | |
| 2014/0019471 | A1* | 1/2014 | Linton | G06N 5/02 707/759 |
| 2014/0180755 | A1* | 6/2014 | Prieto | G06Q 50/08 705/7.28 |
| 2014/0288995 | A1* | 9/2014 | Huff | G06Q 10/0635 705/7.28 |
| 2015/0025933 | A1* | 1/2015 | Andelman | G06Q 10/0635 705/7.28 |
| 2015/0046363 | A1* | 2/2015 | McNamara | G06Q 10/0635 705/333 |
| 2015/0066569 | A1* | 3/2015 | Ervolina | G06Q 10/06315 705/7.25 |
| 2016/0217406 | A1* | 7/2016 | Najmi | G06Q 10/06315 |

OTHER PUBLICATIONS

E. Tranvouez and A. Ferrarini, "MultiAgent Modelling of Cooperative Disruption Management in Supply Chains," 2006 International Conference on Service Systems and Service Management, 2006, pp. 853-858. (Year: 2006).*

Wenyin, Z. et al., "Semi-fragile spatial watermarking based on local binary pattern operators," *Optics Communications*, 284 (2011) pp. 3904-3912.

Dittmann, J. et al., "Combining digital Watermarks and collusion secure Fingerprints for digital Images," Proc. SPIE 3657, *Security and Watermarking of Multimedia Contents*, 171, (Apr. 9, 1999); 12 pages.

* cited by examiner

| Transport Operation | Work Order | 2-Dec | 9-Dec | 16-Dec | 23-Dec | 27-Jan | 17-Feb |
|---|---|---|---|---|---|---|---|
| Original Plan | | | | | | | |
| Transport-Chip1-from-Asia_Fab-to-Asia_AT1 | 6 | 200 | | | | | |
| | 13 | | 200 | | | | |
| | 26 | | | 200 | | | |
| | 41 | | | | 200 | | |
| | 55 | | | | | 200 | |
| | 62 | | | | | | 200 |
| Revised Plan | | | | | | | |
| Transport-Chip1-from-Asia_Fab-to-Asia_AT1 | 6 | 200 | | | | | |
| | 13 | | 200 | | | | |
| | 26 | | | 200 | | | |
| | 41 | | | | 200 | | |
| | 55 | | | | | 200 | |
| Transport-Chip1-from-US_Fab-to-Asia_AT1 | 73 | | | | | | 200 |

FIG. 5

| Workorder | Producing Operation | 14-Feb | 16-Feb | 18-Feb | 23-Feb | 25-Feb | 4-Mar |
|---|---|---|---|---|---|---|---|
| Original Plan | | | | | | | |
| 59 | Create_Asia_Chip2 | | 200 | | | | |
| 60 | Transport-Chip2-from-Asia_Fab-to-Asia_AT1 | | | 200 | | | |
| 61 | Create_Asia_Chip1 | | 200 | | | | |
| 62 | Transport-Chip1-from-Asia_Fab-to-Asia_AT1 | | | 200 | | | |
| 63 | Asia_AT1_Device1 | | | | | 200 | |
| 64 | Transport-Device1-from-Asia_AT1-to-US Market | | | | | | 200 |
| Revised Plan | | | | | | | |
| 64 | Transport-Device1-from-Asia_AT1-to-US Market | | | | | | 200 |
| 72 | Create_Asia_Chip2 | 200 | | | | | |
| 73 | Transport-Chip2-from-Asia_Fab-to-Asia_AT1 | | 200 | | | | |
| 74 | Create_Asia_Chip1 | 200 | | | | | |
| 75 | Transport-Chip1-from-Asia_Fab-to-Asia_AT1 | | 200 | | | | |
| 76 | Asia_AT1_Device1 | | | | 200 | | |

FIG. 6

| Demand ID | Item | Market | Demand Quantity | Due Date | Planned Date | | | | | | | | | |
|---|---|---|---|---|---|---|---|---|---|---|---|---|---|---|
| | | | | | 23-Dec | 24-Dec | 31-Dec | 5-Jan | 8-Jan | 14-Jan | 15-Jan | 5-Feb | 15-Feb | 5-Mar | 15-Mar |
| Original Plan | | | | | | | | | | | | | | | |
| Order 1 | Device 1 | US | 850 | 5-Dec | 200 | 300 | 350 | | | | | | | | |
| Order 2 | Device 2 | Asia | 800 | 5-Jan | | | | 500 | 100 | | | | | | |
| Order 3 | Device 2 | Asia | 500 | 5-Feb | | | | | | | | 500 | | | |
| Order 4 | Device 1 | US | 300 | 5-Mar | | | | | | | | | | 300 | |
| Updated Plan | | | | | | | | | | | | | | | |
| Order 11 | Device 1 | US | 250 | 15-Dec | | | | | 150 | | 100 | | | | |
| Order 12 | Device 2 | Asia | 300 | 15-Jan | | | | | | | 300 | | | | |
| Order 13 | Device 2 | Asia | 200 | 15-Feb | | | | | | | | | 200 | | |
| Order 14 | Device 1 | US | 100 | 15-Mar | | | | | | | | | | | 100 |

FIG. 7

| Transport Operation | Work Order | 2-Dec | 9-Dec | 16-Dec | 23-Dec | 27-Jan | 17-Feb |
|---|---|---|---|---|---|---|---|
| Original Plan | | | | | | | |
| Transport-Chip1-from-Asia_Fab-to-Asia_AT1 | 6 | 200 | | | | | |
| | 13 | | 200 | | | | |
| | 26 | | | 200 | | | |
| | 41 | | | | 200 | | |
| | 55 | | | | | 200 | |
| | 68 | | | | | | 200 |
| Revised Plan | | | | | | | |
| Transport-Chip1-from-Asia_Fab-to-Asia_AT1 | 6 | 200 | | | | | |
| | 13 | | 200 | | | | |
| | 26 | | | 200 | | | |
| | 41 | | | | 200 | | |
| | 55 | | | | | 200 | |
| SOS_Make_Ship_Chip1_from_PremiumFab-to-Asia_AT1 | 73 | | | | | | 200 |

FIG. 8

| Transport Operation | Work Order | 2-Dec | 9-Dec | 16-Dec | 23-Dec | 27-Jan | 17-Feb |
|---|---|---|---|---|---|---|---|
| Original Plan | | | | | | | |
| Transport-Chip1-from-Asia_Fab-to-Asia_AT1 | 6 | 200 | | | | | |
| | 13 | | 200 | | | | |
| | 26 | | | 200 | | | |
| | 41 | | | | 200 | | |
| | 55 | | | | | 200 | |
| | 62 | | | | | | 200 |
| Revised Plan | | | | | | | |
| Transport-Chip1-from-Asia_Fab-to-Asia_AT1 | 6 | 200 | | | | | |
| | 13 | | 200 | | | | |
| | 26 | | | 200 | | | |
| | 41 | | | | 200 | | |
| | 55 | | | | | 200 | |
| SCB_Transport_Chip1_from_Asia_AT2_to_Asia_AT1 | 73 | | | | | | 200 |

SYSTEM AND METHOD FOR RISK MANAGEMENT IN A SUPPLY CHAIN

PRIORITY CLAIM

This U.S. patent application claims priority under 35 U.S.C. § 119 to: India Application No. 2659/MUM/2015, filed on Jul. 14, 2015. The entire contents of the aforementioned application are incorporated herein by reference.

TECHNICAL FIELD

This disclosure relates generally to risk management. More particularly, the present disclosure relates to a system and method for risk management in supply chain model.

BACKGROUND

Nowadays supply chain cycles in any product based industry operate in a volatile global environment, and are highly susceptible to risks. These risks may include failure of demand or supply at different stages in the supply chain. According to a survey from AMR Research, supply chain executives have a sharp awareness of the importance of supply chain risks and are actively investing in risk management initiatives.

Supply chain risks are broadly classified into operational risks and disruption risks. The operational risks may be generated by human errors and can be resolved by minor modification to a master plan associated with the supply chain. However, disruption risks arise generally due to natural disasters like earthquakes, tsunamis, geopolitical changes, and so on. While disruption risks have a greater impact on business than operational risks, they also have a lower frequency of occurrence. Operational risks are more frequent and if left undetected or unresolved, they can lead to severe financial losses. Hence, a comprehensive risk mitigation program is required in place to identify, avoid and/or recover from both operational and disruption risks.

However, there is lack of tools, frameworks, and decision-making structures for supply chain risk management. Advanced Planning and Scheduling (APS) systems are widely used in supply chain management for planning purposes, but they are predominantly concerned with deterministic planning. The major challenges with existing technology for risk management are that:

- Current methods of supply chain risk management are predominantly concerned with deterministic planning and disruption management capabilities are significantly limited
- There is no clear framework to address different types of risks in complex supply chains
- There is no means to address short term and long term disruptions in the supply chain using a single platform

SUMMARY

Embodiments of the present disclosure present technological improvements as solutions to one or more of the above-mentioned technical problems recognized by the inventors in conventional systems. This summary is not intended to identify essential features of the claimed subject matter nor is it intended for use in determining or limiting the scope of the claimed subject matter.

For example, in one embodiment, a system for risk management in a supply chain is disclosed. The system comprises a memory and a processor coupled to the memory, wherein the processor is configured to execute instructions stored in the memory for maintaining a supply chain repository storing an original buffer level, a current plan, and a set of future plans for a predetermined time interval, wherein the original buffer level is associated with an inventory corresponding to at least one stage of the supply chain, and wherein the current plan and the set of future plans are part of a master plan associated with the supply chain. Further, the processor is configured to execute instructions stored in the memory for monitoring each stage associated with the supply chain to identify at least one of a short term disruption or a long term disruption associated with a stage of the supply chain. Once the short term disruption or the long term disruption is identified, the processor is configured to execute instructions stored in the memory for resolving the short term disruption in the supply chain by updating the original buffer level of an inventory associated with the supply chain or by revising the current plan and at least one plan from the set of future plans associated with the supply chain. Further, the processor is configured to execute instructions stored in the memory for resolving the long term disruption in the supply chain by identifying a problem similar to the long term disruption and a solution corresponding to the problem from a historical database, wherein the historical database is configured to maintain a set of problems and the set of solutions corresponding to the set of problems. Once the problem and solution are identified, the processor is configured to execute instructions stored in the memory for calibrating the solution identified from the historical database, based on a predefined set of rules and revising the current plan and at least one plan from the set of future plans associated with the supply chain based on the solution calibrated.

In another embodiment, a method for risk management in a supply chain is disclosed, wherein the method is implemented by a processor. Initially, a supply chain repository storing an original buffer level, a current plan and a set of future plans for a predetermined time interval is maintained by a processor, wherein the original buffer level is associated with an inventory corresponding to at least one stage of the supply chain, and wherein the current plan and the set of future plans are part of a master plan associated with the supply chain. In the next step, the processor is configured to monitor each stage associated with the supply chain to identify at least one of a short term disruption or a long term disruption associated with a stage of the supply chain. Further, the processor is configured to resolve the short term disruption in the supply chain by updating the original buffer level of an inventory associated with the supply chain or by revising the current plan and at least one plan from the set of future plans associated with the supply chain. Further, if a long term disruption is identified, then the processor is configured to resolve the long term disruption in the supply chain by identifying a problem similar to the long term disruption and a solution corresponding to the problem from a historical database, wherein the historical database is configured to maintain a set of problems and the set of solutions corresponding to the set of problems. Once the problem and solution are identified, the processor is configured to calibrate the solution identified from the historical database based on a predefined set of rules and revise the current plan and at least one plan from the set of future plans associated with the supply chain based on the solution calibrated.

In yet another embodiment, a computer program product having embodied thereon a computer program for risk management in a supply chain is disclosed. The program comprises a program code for maintaining a supply chain repository storing an original buffer level, a current plan and a set of future plans for a predetermined time interval, wherein the original buffer level is associated with an inventory corresponding to at least one stage of the supply chain, and wherein the current plan and the set of future plans are part of a master plan associated with the supply chain. Further, the program comprises a program code for monitoring each stage associated with the supply chain to identify at least one of a short term disruption or a long term disruption associated with a stage of the supply chain. Further, the program comprises a program code for resolving the short term disruption in the supply chain by, updating the original buffer level of an inventory associated with the supply chain or by revising the current plan and at least one plan from the set of future plans associated with the supply chain. Furthermore, the program comprises a program code for resolving the long term disruption in the supply chain by identifying a problem similar to the long term disruption and a solution corresponding to the problem from a historical database, wherein the historical database is configured to maintain a set of problems and the set of solutions corresponding to the set of problems, calibrating the solution, identified from the historical database, based on a predefined set of rules, and revising the current plan and at least one plan from the set of future plans associated with the supply chain based on the solution calibrated.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 illustrates Table 2 exemplifying an original and revised plan for addressing short term disruption in source process.

FIG. 6 illustrates Table 3 exemplifying original and revised plan for addressing short term disruption in make process.

FIG. 7 illustrates Table 4 exemplifying original and revised plan for addressing short term disruption in deliver process.

FIG. 8 illustrates Table 5 exemplifying adaptive immunity layer response: Sourcing from the Premium Fab.

FIG. 9 illustrates Table 6 exemplifying adaptive immunity layer response: Shipping from AT2 to AT1.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The system is configured to maintain a supply chain repository storing an original buffer level, a master plan, wherein master plan is divided into a current plan and a set of future plans for managing the operations in the supply chain. Further, the system is configured to monitor each stage associated with the supply chain to identify at least one of a short term disruption or a long term disruption associated with a stage of the supply chain. Further, the system is configured to resolve the short term disruption by updating the original buffer level of an inventory or by revising the current plan and at least one of the set of future plans associated with the supply chain. Further, the system is configured to resolve the long term disruption in the supply chain using a set of problems and a set of solutions stored in a historical database.

While aspects of described system and method for risk management in supply chain are implemented over a dedicated platform, it may be implemented in any number of different computing systems, environments, and/or configurations, the embodiments are described in the context of the following exemplary system.

Figure 1:
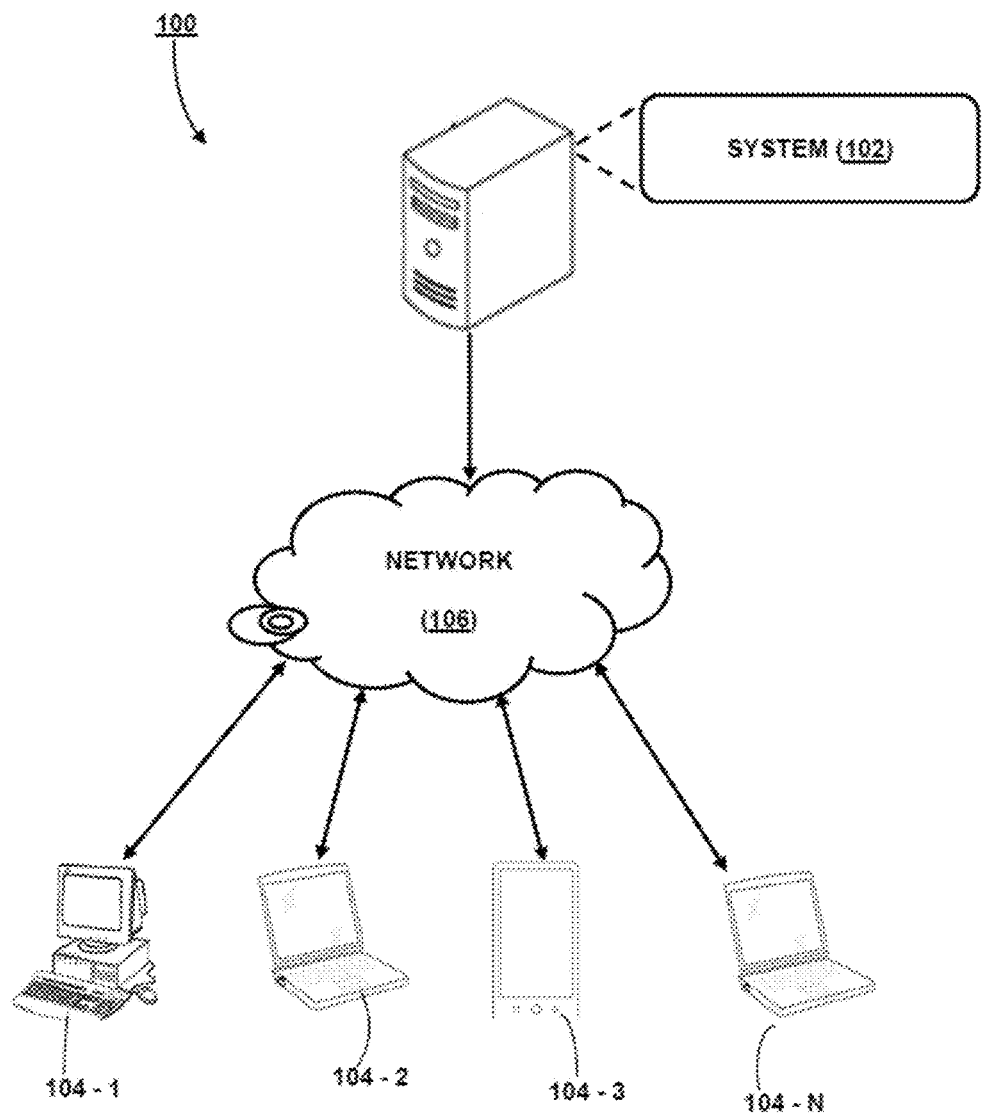
FIG. 1 illustrates a network implementation of a system for risk management in supply chain, in accordance with an embodiment of the present disclosure.

Referring now to FIG. 1, a network implementation 100 of a system 102 for risk management in a supply chain is illustrated in accordance with an embodiment of the present disclosure. Although the present disclosure is explained by considering that the system 102 is implemented as a software program on a server, it may be understood that the system 102 may also be implemented in a variety of computing systems, such as a laptop computer, a desktop computer, a notebook, a workstation, a mainframe computer, a server, a network server, cloud, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a hand-held device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that uses a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
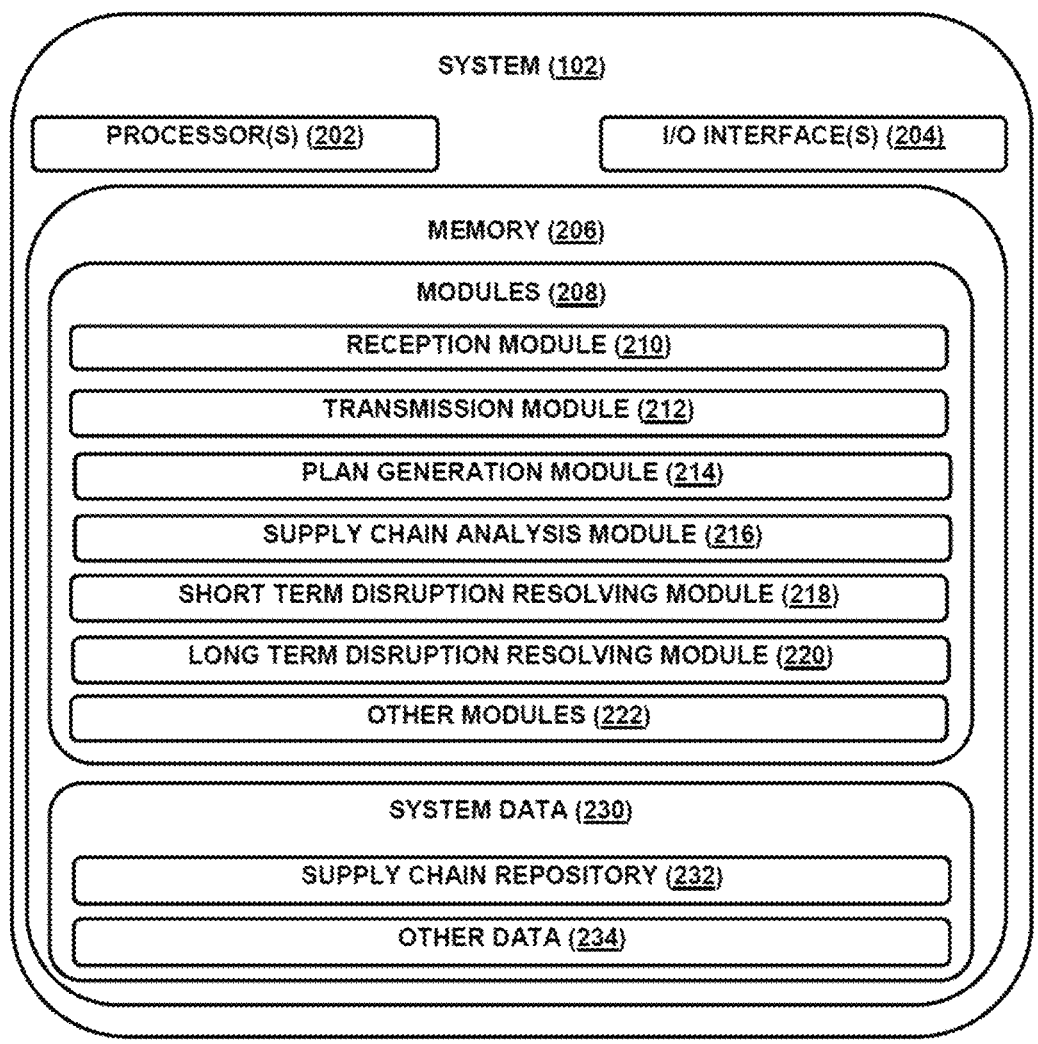
FIG. 2 illustrates the system for risk management in supply chain, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and system data 230.

The modules 208 include routines, programs, objects, components, data structures, etc., which perform particular tasks or implement particular abstract data types. In one implementation, the modules 208 may include a reception module 210, a transmission module 212, a plan generation module 214, a supply chain analysis module 216, a short term disruption resolving module 218, a long term disruption resolving module 220, and other modules 222. The other modules 222 may include programs or coded instructions that supplement applications and functions of the system 102.

The system data 230, amongst other things, serves as a repository for storing data processed, received, and generated by one or more of the modules 208. The system data 230 may also include a supply chain repository 232 and other data 234. The other data 234 may include data generated as a result of the execution of one or more modules in the other modules 222. Further, the supply chain repository 232 is configured to maintain, a master plan associated with the supply chain wherein the master plan is generated by the plan generation module 214. In one embodiment, the master plan is collection of a current plan and a set of future plans, wherein the current plan is associated with manufacturing and distribution strategies to be followed at each stage of the supply chain for a current week, whereas each future plan from the set of future plans is indicative of manufacturing strategies to be followed for an upcoming week. Further, the master plan is designed to manage production and distribution of goods at different stages of the supply chain for a predetermined time interval. In one embodiment, the total duration of the master plan may be in terms of number of months or years, whereas the duration of the current plan or each future plan from the set of future plans may vary from number of days to number of weeks. Further, the manufacturing of goods in each future plan may be varied in each stage based on a projected demand of goods in near future. In one embodiment, the plan generation module 214 may receive inputs from a user of the system 102 using the I/O interface 204 and accordingly generate the current plan and the set of future plans associated with the master plan. The plan generation module 214 may also be configured to enable various future prediction algorithms available in the art, in order to generate the master plan for manufacturing, wherein the future prediction algorithms work on the available historical demand data, supply data, and trends. Further, the plan generation module 214 is also configured to generate and maintain a historical database configured to store a set of problems that are historically faced in the supply chain and the set of solutions corresponding to the set of problems. These problem solution sets may be manually generated or may be generated in an automated manner using artificial intelligence platform. The historical database is generated and stored in the supply chain repository 232.

Once the master plan and historical database are generated and stored in the supply chain repository 232, in the next step, the supply chain analysis module 216 is configured to monitor each stage associated with the supply chain to identify at least one of a short term disruption or a long term disruption associated with a stage of the supply chain. The stages associated with the supply chain may be selected from sourcing raw materials, manufacturing goods, and delivering goods. In one embodiment, the short term disruptions or the long term disruptions may be related to any stage or multiple stages in the supply chain. The short term disruption is generated due to increase of demand due to market conditions or decrease of supply in at least one stage of the supply chain, wherein the increase or decrease can usually be addressed by changing the original buffer level. The long term disruption is caused due to major fluctuations in demand and supply in at least one stage the supply chain that are caused due to natural disasters or epidemics (which are rare in occurrence but cause major damage to the supply chain); and wherein the increase or decrease is out of the scope of the original buffer level. The original buffer level is nothing but the number of goods maintained in the inventory in order to compensate for minor variations in a demand and supply chain.

In one embodiment, if a short term disruption is identified, in the next step, the short term disruption resolving module 218 is configured for updating the original buffer level of the inventory associated with the supply chain in order to address the short term disruption. Further, the short term disruption may also be addressed by revising the current plan and at least one plan from the set of future plans associated with the supply chain.

In one embodiment, if a long term disruption is identified, in the next step, the long term disruption resolving module 220 is configured to resolving the long term disruption in the supply chain by identifying a problem similar to the long term disruption and a solution corresponding to the problem from a historical database. The historical database also acts as an adaptive memory where each and every unidentified problem and the solution derived for it is recorded for future reference. Further, the problem similar to the long term disruption may be identified from the historical database by performing root cause analysis and identifying closest problem similar to the long term disruption and a set of parameters associated with the supply chain. Wherein the set of parameters include the stage at which the disruption is caused, the present and future impact of the disruption on the supply chain, and the like. Once the problem is identified, in the next step, the long term disruption resolving module 220 is configured to calibrate the solution corresponding to the problem identified from the historical database based on a predefined set of rules. These predefined set of rules are configured to fine-tune the solution based on the current plan and the set of future plans associated with the supply chain. In one example, for the purpose of fine tuning, let solution identified from the historical database state that a manufacturing process should be initiated by date D1. However, due to lack of capacity this solution is infeasible. In order to address this variation, the long term disruption resolving module 220 may fine tune the identified solution by identifying dates closer to D1 (e.g. D1+1, D1−1, D1+2, D1−2, . . . ) to start the manufacturing process, where capacity is available and the solution can be fine-tuned accordingly.

In the next step, the current plan and at least one future plan from the set of future plans associated with the supply chain is revised based on the solution calibrated. In one embodiment, if a problem similar to the long term disruption is not present in the historical database, the long term disruption resolving module 220 is configured to collectively analyse one or more problems and parameters associated with the long term disruption to generate a solution for the long term disruption in the supply chain, wherein the one or more problems and parameters associated with the long term disruption are identified from the historical database. The developed solution is further tested and refined to address the long term disruption. Further, the long term disruption resolving module 220 also records this developed solution and the corresponding long term disruption in the historical database for future referencing. The system 102 for risk management in supply chain is further explained with respect to the flowcharts of FIG. 3.

Figure 3:
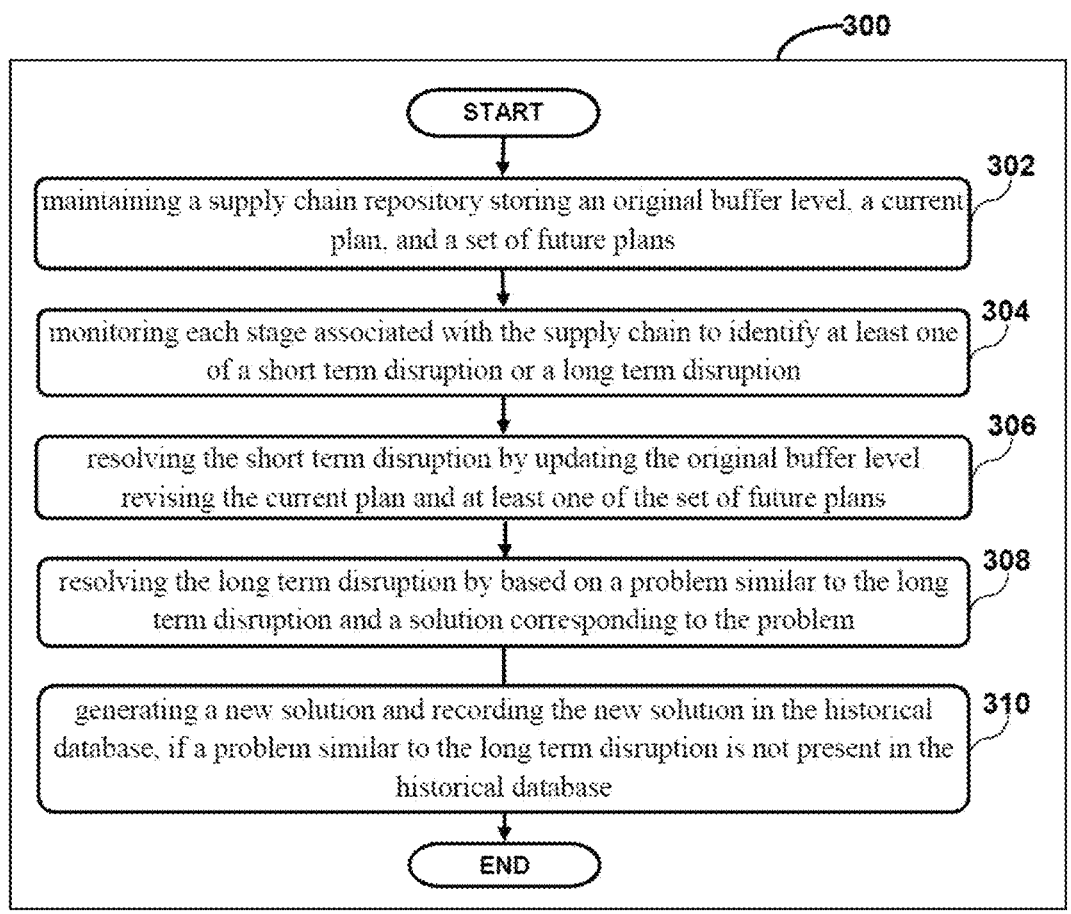
FIG. 3 illustrates a flowchart representing a method for risk management in supply chain, in accordance with an embodiment of the present disclosure.

Referring now to FIG. 3, a flowchart for risk management in supply chain is disclosed. At block 302, the plan generation module 214 is configured to generate a master plan associated with the supply chain and store the master plan in the supply chain repository 232. In one embodiment, the master plan is a collection of current plan and a set of future plans. In one embodiment, the plan generation module 214 may receive inputs from a user of the system 102 over the I/O interface 204 and accordingly generate the current plan and the set of future plans associated with the master plan. The plan generation module 214 may also be configured to enable various future prediction algorithms available in the art, in order to generate the master plan for manufacturing and distribution, wherein the future prediction algorithms work on the available historical demand data, supply data, and trends. Further, at block 302, the plan generation module 214 is also configured to generate a historical database configured to maintain a set of problems that are historically faced in the supply chain and the set of solutions corresponding to the set of problems. These problem solution sets may be manually generated or may be generated in an automated manner using artificial intelligence. The historical database is also generated and stored in the supply chain repository 232.

At block 304, once the master plan and historical database are generated and stored in the supply chain repository 232, in the next step, the supply chain analysis module 216 is configured to monitor each stage associated with the supply chain to identify at least one of a short term disruption or a long term disruption associated with a stage of the supply chain. In one embodiment, the short term disruptions or the long term disruptions may be related to any stage or multiple stages in the supply chain. The short term disruption is generated due to increase in demand or decrease of supply in at least one stage the supply chain, wherein the increase or decrease is within the scope of the original buffer level. The original buffer level is nothing but the number of goods maintained in the inventory in order to compensate for minor variations in a demand and supply chain. With reference to capacity, buffer level indicates the available capacity to manufacture or store goods per time period/cycle.

At block 306, if a short term disruption is identified, in the next step, the short term disruption resolving module 218 is configured to updating the original buffer level of the inventory associated with the supply chain in order to address the short term disruption. Further, the short term disruption may also be addressed by revising the current plan and at least one of the set of future plans associated with the supply chain in order to address the short term disruption.

At block 308, if a long term disruption is identified, in the next step, the long term disruption resolving module 220 is configured to resolving the long term disruption in the supply chain by identifying a problem similar to the long term disruption and a solution corresponding to the problem from a historical database. Further, the problem similar to the long term disruption may be identified from the historical database by performing root cause analysis and identifying problem similar to the long term disruption based on a set of parameters such as the stage at which the disruption is caused, the present and future impact of the disruption on the supply chain, and the like. Once the problem is identified, in the next step, the long term disruption resolving module 220 is configured to calibrating the solution corresponding to the problem identified from the historical database, based on a predefined set of rules. These predefined set of rules are configured to fine-tune the solution based on the current plan and the set of future plans associated with the supply chain. In the next step, the current plan and at least one of the set of future plans associated with the supply chain is revised based on the solution calibrated.

At block 310, if a problem similar to the long term disruption is not present in the historical database, the long term disruption resolving module 220 is configured to collectively analyse one or more problem and parameters associated with the long term disruption to generate a new solution for the long term disruption in the supply chain, wherein the one or more problems and parameters associated with the long term disruption are identified from the historical database. The new solution is further tested and refined to address the long term disruption. Further, the long term disruption resolving module 220 also records this new solution and the corresponding long term disruption in the historical database for future referencing.

Figure 4A:
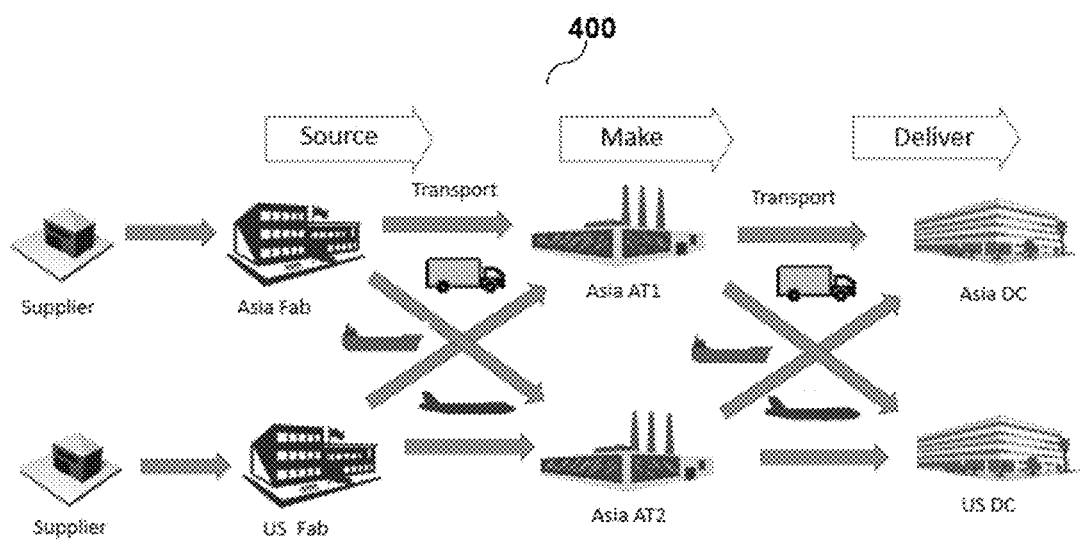
FIGS. 4a and 4b illustrate a supply chain model under analysis for identifying and resolving short term and long term disruptions by the system, in accordance with an embodiment of the present disclosure.
Figure 4B:
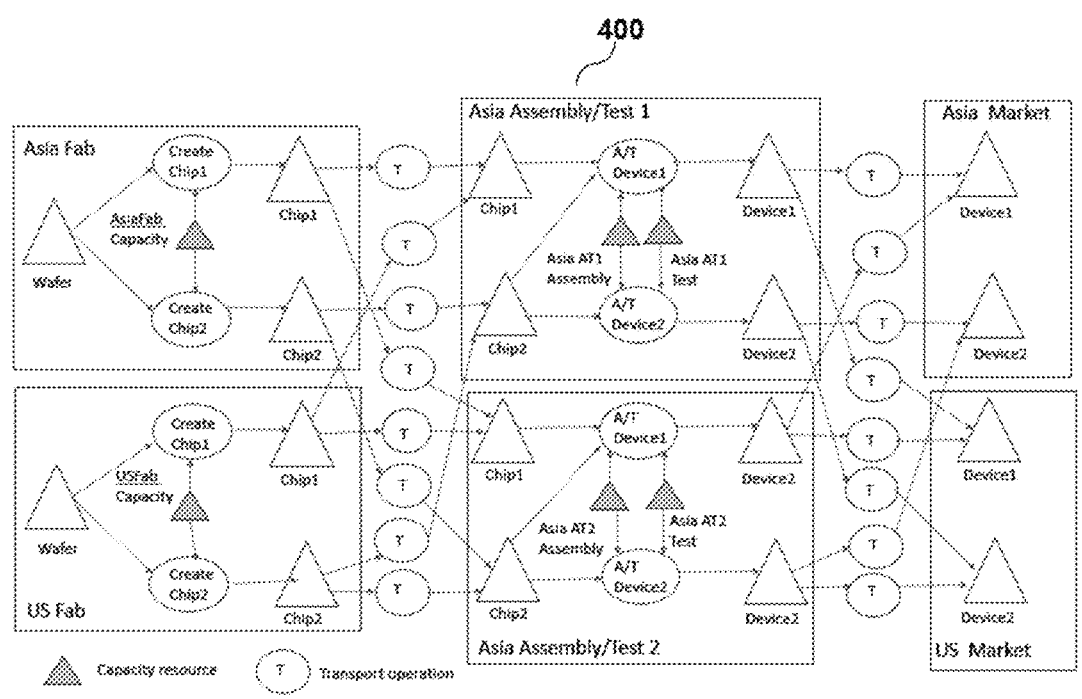

In one example, a supply chain 400 for manufacturing semiconductor chips is disclosed in FIG. 4*a* and FIG. 4*b*. The circles in the supply chain 400 represent operations, the triangles represent inventory locations, and the smaller triangles represent capacity resources in the supply chain 400. The manufacturing process in the supply chain 400 starts with the conversion of wafers into chips in a fabrication facility (Fab). In this example, the chips are sourced from a chip manufacturer and the Fab capacity data are available to the plan generation module 214. The chips are then transported to an assembly/test facility (A/T) where the chips are converted/installed into devices. The devices are then delivered to customers in various markets, possibly through distribution centres. FIG. 4*a* also shows a mapping between the standard SCOR processes and the different stages in the semiconductor supply chain as follows.

SOURCE→Fab

MAKE→A/T

DELIVER→Market

In one embodiment, in order to address the short term disruptions and the long term disruptions in the supply chain 400, the supply chain is modelled as an Artificial Immune System (AIS). Further, the system 102 enables an innate immunity layer to address the short term disruptions and an adaptive immunity layers to address the long term disruptions in the supply chain 400. As described above, the innate immunity layer is enabled by the short term disruption resolving module 218 and the adaptive immunity layer is enabled by the long term disruption resolving module 220. The short term disruptions and the long term disruptions in the supply chain 400 correspond to simple antigens and complex antigens respectively in the Artificial Immune System (AIS). The antigens are configured to disturb the supply chain 400 by attacking different levels in the supply chain 400. Further, the process of supply chain management starts by generating a master plan. In one example, for generating the master plan, the demand and capacity used by the plan generation module 214 for generating the master plan are shown in Tables 1a and 1b. Further, there is more than sufficient stock/original buffer level for the Wafer inventory in the Fab to cover about ten times the demand. The plan generation module 214 is configured to generate a master plan based on the demand and capacity data stored in Table 1a and 1b. The master plan horizon is one year long, starting in the month of October. In one embodiment, the master plan is generated by the plan generation module 214 using a standard planning engine available in the art such as the JDA Supply Chain Planner. Further, since the supply chain is modelled as AIS, the master plan corresponds to a host in the AIS.

TABLE 1a

Demand data

| ID | Item | Market | Date | Quantity |
|---|---|---|---|---|
| 1 | Device1 | Asia | 5-Dec | 850 |
| 2 | Device2 | US | 5-Jan | 600 |
| 3 | Device2 | US | 5-Feb | 500 |
| 4 | Device1 | Asia | 5-Mar | 300 |

TABLE 1b

Capacity data

| Resource | Units/Week |
|---|---|
| Asia AT1 Assembly | 200 |
| Asia AT1 Test | 200 |
| Asia AT2 Assembly | 400 |
| Asia AT2 Test | 300 |
| Asia Fab | 1000 |
| US Fab | 3000 |

In one embodiment, the master plan yields a set of instructions called work orders for each operation with planned start dates and quantities. When a short term disruption or a long term disruption occurs, it impacts the master plan at one of the three processes in the corresponding SCOR model—SOURCE, MAKE, or DELIVER.

The process adopted by the system 102 for addressing the short term disruption or long term disruption starts by identifying a disruption in the supply chain by the supply chain analysis module 216. Once the disruption is identified, the supply chain analysis module 216 further analyses the disruption based on at least one impact analysis technique in order to determine whether the disruption is a short term disruption or a long term disruption. Further, the supply chain analysis module 216 classifies the risk management process in two parts: In the first part, an innate immunity layer generated by the short term disruption resolving module 218 is enabled to address short term disruption/simple antigen by updating the buffer levels in a master plan or by generating new demand satisfaction plan as needed. In the second part, the long term disruption/complex antigen is addressed by an adaptive immunity layer generated by the long term disruption resolving module 220, wherein the adaptive immunity layer is configured to maintain antibodies (set of problems and set of solutions in the historical database) in order to address the long term disruptions.

In one embodiment, the innate immunity layer is enabled to identify disruptions in at least one stage of the supply chain by superimposing the current plan on the demand and supply fluctuations. In one example, if the supply chain analysis module 216 identifies a short term disruption in the supply chain 400, wherein a shipment from the Asia Fab is disrupted and there is no possibility of replenishment from the Asia Fab. To address this short term disruption, the innate immunity layer enables identifying alternate option and explores an alternatives source in the form of US Fab for providing the shipment in order to compensate the loss of shipment from the Asia Fab as shown in Table 2 of FIG. 5.

In one embodiment, if a short term disruption is identified in the manufacturing stage of the supply chain 400, in the form of capacity shortage failure at the A/T factory (Asia AT1), then the short term disruption in addressed by the innate immunity layer as shown in Table 3 of FIG. 6 by:
- converting the capacity shortage into a material shortage on the produced item (Device 1 at Asia AT1)
- using the pre-build option to utilize the unused capacity from an earlier week (previous week plan)
- since this modification in the plan would require chips to be available a week earlier, the master plan is also changed accordingly
- the work orders for the extra unused chips are cancelled for avoiding inventory buildup, and Fab capacity wastage.

In one embodiment, if a short term disruption is identified in the delivery stage of the supply chain 400, in the form of demand spikes, then the short term disruption is addressed by the innate immunity layer by modeling a number of new orders that are superimposed on the original plan. Since no plan exists for these new orders, the innate immunity layer generates an incremental plan for these new orders, using the same performance objective. Hence in this case, the planners may see the feasible plan much before the next scheduled is run by the plan generation module 214. The results of this revision are shown in Table 4 of FIG. 7. Note that the updated plan is superimposed on the original plan; in other words the updated plan includes the plan for all orders.

In one embodiment, if the supply chain analysis module 216 detects a long term disruption in the supply chain 400, such that all the alternate resources and routes defined in the innate immunity layer are insufficient in order to address the disruption, in such a situation, the system 102 enables the adaptive immunity layer to address the long term disruptions. In one embodiment, the adaptive immunity layer is configured to communicate with a historical database, wherein the historical database is configured to store a set of problems historically faced in the supply chain and a set of solutions corresponding to the set of problems. In this example, the historical database may be configured to store additional data corresponding to Premium Fabs (capacity, cost), expedited shipping routes/modes (time, cost), and so on. These are normally not part of the supply chain, because of contractual, cost, or occasional use reasons. The adaptive immunity layer is configured to look into such problems that cannot be solved by the innate immunity layer in the supply chain model and generate a solution for these long term disruptions.

In one example, a variant of the source disruption scenario is identified as a long term disruption in the supply chain 400, wherein the shipments from the Asia Fab and the US Fab is already being fully utilized. This results in a shortage of chips at Asia AT1. Since the US Fab is also constrained the partial plan solution suggested by the innate immunity layer does not apply. At this point, the adaptive immunity layer is configured to generate a solution (antibodies) for the problem (Chip shortage at Asia AT1).

Since the original network does not include Premium Fab, the adaptive immunity layer is configured to add the Premium Fab to the supply chain, generate routes to AT1, and revise the master plan of the supply chain 400. The result of this modification is shown in Table 5 of FIG. 8.

In one example, in the event that a sustained demand increase or supply shortfall at Asia Fab is experienced, the adaptive immunity layer works with procurement to add Premium Fab to the network. Further, another modification that may be generated by the adaptive immunity layer is by giving one more option in the above disruption during the course of combinatorial antibody generation. The combinational antibodies are generated by identifying more than one problem similar to the long term disruption and accordingly generating solution based on the solutions corresponding to the identified problem. For instance, considering the case where there is some extra inventory of Chip1 at Asia_AT2, but there is a shortage at Asia_AT1. The original and revised plans for this case are shown in Table 6 of FIG. 9.

In one embodiment, the antigens identified and antibodies selected for both these cases are represented in Tables 7a and 7b. This can be reviewed by the planner, who can then select the most preferable solution i.e. antibody for the corresponding antigen. The comment column indicates qualitatively how a planner would assess each solution. In this case, shipping the chips from AT1 to AT2 seems to be the best option.

TABLE 7a

Antigen for disruption at Source

| Disruption | Item | Location | Quantity | Date |
|---|---|---|---|---|
| Source | Chip 1 | Asia Fab | 100 | 18-Feb |

TABLE 7b

Sample antibodies for disruption at Source

| Process | Item | Location | Quantity | Date | Feasible | Comment |
|---|---|---|---|---|---|---|
| Source | Chip 1 | Asia Fab | 100 | 18-Feb | No | Disrupted |
| Source | Chip 1 | US Fab | 100 | 18-Feb | No | Fully Utilized |
| Source | Chip 1 | Premium Fab | 100 | 18-Feb | Yes | Higher cost |
| Source | Chip 1 | AT 2 | 100 | 18-Feb | Yes | Preferred |

Although implementations of system and method are disclosed for risk management in supply chain, it is to be understood that the appended claims are not necessarily limited to the specific features or methods described herein. However, the specific features and methods are disclosed as examples of implementations for risk management in supply chain.

What is claimed is:

1. A system for disruption management in a supply chain based on an artificial immunity model, the system comprising:
a memory; and
a processor coupled to the memory, wherein the processor is configured to execute instructions stored in the memory for:
maintaining a supply chain repository storing an original buffer level, a current plan, and a set of future plans for a predetermined time interval, wherein the supply chain repository contains data representing physical supply chain elements involved in manufacturing and distribution of products, comprising items or products, resources, locations, operations, transport routes, and transport modes with transport related properties, wherein the original buffer level is associated with an inventory corresponding to at least one stage of the supply chain, and wherein the current plan and the set of future plans are part of a master plan associated with the supply chain, wherein the master plan contains planned start dates and quantities for different stages of the supply chain, comprising sourcing raw material, manufacturing goods, and delivering goods;
monitoring each stage associated with the supply chain to identify at least one of a short term disruption or a long term disruption associated with a stage of the supply chain, wherein the short term disruption, caused by minor variations in supply, capacity, or demand, is characterized as a simple antigen and the long term disruption, caused by major fluctuations in supply, capacity, or demand, is characterized as a complex antigen in the artificial immunity model implemented by the processor, and wherein the simple antigen or the complex antigen is described by (a) stages of the supply chain, (b) item, (c) location, (d) quantity and (e) date;
automatically generating, using the artificial immunity model implemented by the processor, solutions for the short term disruption through an innate immunity layer, by, at least one of:
a) updating the original buffer level of an inventory associated with the supply chain; or
b) revising the current plan and at least one of the set of future plans associated with the supply chain by at least one of a) a pre-build option to utilize the unused capacity from an earlier week; b) identifying an alternate option of resources and routes and c) exploring an alternative source for providing the inventory in order to compensate the short term disruption;
automatically generating, using the artificial immunity model implemented by the processor, solutions for the long term disruption through an adaptive immunity layer;
when all the alternate resources and routes defined in the innate immunity layer are insufficient for generating a solution to the long term disruption, automatically generating solutions for the long term disruption through the adaptive immunity layer in the artificial immunity model implemented by the processor, by creating antibodies described by (a) stages of supply chain, (b) item, (c) location, (d) quantity and (e) date, and using additional data to transform the supply chain, by identifying a problem similar to the long term disruption and the solution corresponding to the problem from a historical database, wherein the historical database acts as an adaptive memory, wherein the historical database is configured to maintain a set of problems and the set of solutions corresponding to the set of problems and fine-tuning the solution, identified from the historical database, based on a predefined set of rules comprising pre-building, expedited shipping routes and modes, wherein the problem similar to the long term disruption is identified from the historical database by performing root cause analysis and identifying a closest problem similar to the long term disruption, the corresponding solutions, and a set of parameters associated with the supply chain;

if the problem similar to the long term disruption is not present in the historical database, collectively analyzing one or more problems, adding new supply chain elements comprising products, resources, locations, operations, transport routes and transport modes, and combinatorially recombining the parameters associated with the supply chain, and automatically generating an alternative supply chain network and a corresponding new solution for the long term disruption in the supply chain, wherein the recombined parameters include the added new resources, locations, transport routes and transport modes;

revising the current plan and at least one of the set of future plans associated with the supply chain network based on the new solution;

refining and testing the new solution to address the long term disruption in the supply chain; and storing the new solution and the long term disruption in the historical database for future referencing; and presenting, through an input/output interface, the generated solutions to a user for selecting a preferred solution.

2. The system of claim 1, wherein the master plan is designed to manage production and distribution of goods at different stages of the supply chain for a predetermined time interval.

3. The system of claim 1, wherein the stages of the supply chain are selected from sourcing raw materials, manufacturing goods, and delivering goods.

4. The system of claim 1, wherein the short term disruption is at least one of increase or decrease of demand in at least one stage of the supply chain, wherein the increase or decrease of demand is within the scope of the original buffer level.

5. The system of claim 1, wherein the long term disruption is at least one of increase or decrease of demand in at least one stage of the supply chain, wherein the increase or decrease in demand is out of the scope of the original buffer level.

6. The system of claim 1, wherein the predefined set of rules are stored in the historical database, and wherein the predetermined set of rules are configured to fine-tune the solution based on the current plan and the set of future plans associated with the supply chain.

7. A computer-implemented method for disruption management in a supply chain based on an artificial immunity model, the method comprising:

maintaining, by a processor, a supply chain repository storing an original buffer level, a current plan and a set of future plans for a predetermined time interval, wherein the supply chain repository contains data representing physical supply chain elements involved in manufacturing and distribution of products, comprising items or products, resources, locations, operations, transport routes, and transport modes with transport related properties, wherein the original buffer level is associated with an inventory corresponding to at least one stage of the supply chain, and wherein the current plan and the set of future plans are part of a master plan associated with the supply chain, wherein the wherein the master plan contains planned start dates and quantities for different stages of the supply chain, comprising sourcing raw material, manufacturing goods, and delivering goods;

monitoring, by the processor, each stage associated with the supply chain to identify at least one of a short term disruption or a long term disruption associated with a stage of the supply chain, wherein the short term disruption, caused by minor variations in supply, capacity, or demand, is characterized as a simple antigen and the long term disruption, caused by major fluctuations in supply, capacity, or demand, is characterized as a complex antigen in the artificial immunity model implemented by the processor, and wherein the simple antigen or the complex antigen is described by (a) stages of the supply chain, (b) item, (c) location, (d) quantity and (e) date;

automatically generating, using the artificial immunity model implemented by the processor, solutions for the short term disruption through an innate immunity layer, by, at least one of:
a) updating the original buffer level of an inventory associated with the supply chain; or
b) revising the current plan and at least one of the set of future plans associated with the supply chain by at least one of a) a pre-build option to utilize the unused capacity from an earlier week; b) identifying an alternate option of resources and routes and c) exploring an alternative source for providing the inventory in order to compensate the short term disruption;

automatically generating, using the artificial immunity model implemented by the processor, solutions for the long term disruption through an adaptive immunity layer;

when all the alternate resources and routes defined in the innate immunity layer are insufficient for generating a solution to the long term disruption, automatically generating solutions for the long term disruption through the adaptive immunity layer in the artificial immunity model implemented by the processor, by creating antibodies described by (a) stages of supply chain, (b) item, (c) location, (d) quantity and (e) date, and using additional data to transform the supply chain, by, identifying a problem similar to the long term disruption and a solution corresponding to the problem from a historical database, wherein the historical database acts as an adaptive memory, wherein the historical database is configured to maintain a set of problems and the set of solutions corresponding to the set of problems and fine-tuning the solution, identified from the historical database, based on a predefined set of rules comprising pre-building, expedited shipping routes and modes, wherein the problem similar to the long term disruption is identified from the historical database by performing root cause analysis and identifying a closest problem similar to the long term disruption, the corresponding solutions, and a set of parameters associated with the supply chain;

if the problem similar to the long term disruption is not present in the historical database, collectively analyzing one or more problems, adding new supply chain elements comprising products, resources, locations, transport routes and transport modes, and combinatorially recombining the parameters associated with the supply chain, and automatically generating an alternative supply chain network and a corresponding new solution for the long term disruption in the supply chain, wherein the recombined parameters include the added new resources, locations, transport routes and transport modes;

revising the current plan and at least one of the set of future plans associated with the supply chain network based on the new solution;

refining and testing the new solution to address the long term disruption in the supply chain; and storing the new solution and the long term disruption in the historical database for future referencing; and presenting, by the processor, through an input/output interface, the generated solutions to a user for selecting a preferred solution.

8. The method of claim 7, wherein the master plan is designed to manage demand and supply of goods at different stages of the supply chain for a predetermined time interval.

9. The method of claim 7, wherein the stages of the supply chain are at least one of sourcing raw material, manufacturing goods, and delivering goods.

10. The method of claim 7, wherein the short term disruption is at least one of increase or decrease of demand in at least one stage of the supply chain, wherein the increase or decrease of demand is within the scope of the original buffer level.

11. The method of claim 7, wherein the long term disruption is at least one of increase or decrease of demand in at least one stage of the supply chain, wherein the increase or decrease in demand is out of the scope of the original buffer level.

12. The method of claim 7, wherein the predefined set of rules are stored in the historical database, and wherein the predetermined set of rules are configured to fine-tune the solution based on the current plan and the set of future plans associated with the supply chain.

13. A computer program product having embodied thereon a computer program for disruption management in a supply chain based on an artificial immunity model, the computer program product comprising:

a program code for maintaining a supply chain repository storing an original buffer level, a current plan and a set of future plans for a predetermined time interval, wherein the supply chain repository contains data representing physical supply chain elements involved in manufacturing and distribution of products, comprising items or products, resources, locations, operations transport routes, and transport modes with transport related properties, wherein the original buffer level is associated with an inventory corresponding to at least one stage of the supply chain, and wherein the current plan and the set of future plans are part of a master plan associated with the supply chain, wherein the master plan contains planned start dates and quantities for different stages of the supply chain, comprising sourcing raw material, manufacturing goods, and delivering goods;

a program code for monitoring each stage associated with the supply chain to identify at least one of a short term disruption or a long term disruption associated with a stage of the supply chain, wherein the short term disruption, caused by minor variations in supply, capacity, or demand, is characterized as a simple antigen and the long term disruption, caused by major fluctuations in supply, capacity, or demand, is characterized as a complex antigen in the artificial immunity model implemented by the processor, and wherein the simple antigen or the complex antigen is described by (a) stages of supply chain, (b) item, (c) location, (d) quantity and (e) date;

a program code for generating, using the artificial immunity model implemented by the processor, solutions for the short term disruption through an innate immunity layer by, at least one of:
 a) updating the original buffer level of an inventory associated with the supply chain; or
 b) revising the current plan and at least one of the set of future plans associated with the supply chain by at least one of a) a pre-build option to utilize the unused capacity from an earlier week; b) identifying an alternate option of resources and routes and c) exploring an alternative source for providing the inventory in order to compensate the short term disruption;

a program code for generating, using the artificial immunity model implemented by the processor, solutions for the long term disruption through an adaptive immunity layer;

when all the alternate resources and routes defined in the innate immunity layer are insufficient for generating a solution to the long term disruption, a program code for generating solutions for the long term disruption through the adaptive immunity layer in the artificial immunity model implemented by the processor, by creating antibodies described by (a) stages of supply chain, (b) item, (c) location, (d) quantity and (e) date, and using additional data to transform the supply chain, by identifying a problem similar to the long term disruption and a solution corresponding to the problem from a historical database, wherein the historical database acts as an adaptive memory, wherein the historical database is configured to maintain a set of problems and the set of solutions corresponding to the set of problems and fine-tuning the solution, identified from the historical database, based on a predefined set of rules comprising pre-building, expedited shipping routes and modes, wherein the problem similar to the long term disruption is identified from the historical database by performing root cause analysis and identifying a closest problem similar to the long term disruption, the corresponding solutions, and a set of parameters associated with the supply chain;

if the problem similar to the long term disruption is not present in the historical database, collectively analyzing one or more problems, adding new supply chain elements comprising products, new resources, locations, transport routes and transport modes, and combinatorially recombining the parameters associated with the supply chain, and automatically generating an alternative supply chain network and a corresponding new solution for the long term disruption in the supply chain, wherein the recombined parameters include the added new resources, locations, transport routes and transport modes;

revising the current plan and at least one of the set of future plans associated with the supply chain network based on the new solution;

refining and testing the new solution to address the long term disruption in the supply chain; and storing the new solution and the long term disruption in the historical database for future referencing; and a program code for presenting, through an input/output interface, the generated solutions to a user for selecting a preferred solution.

* * * * *